(12) United States Patent
Scott et al.

(10) Patent No.: US 9,137,580 B2
(45) Date of Patent: Sep. 15, 2015

(54) SYSTEM AND METHOD TO SEND INFORMATION IDENTIFYING RECOMMENDED MEDIA CONTENT ITEMS

(75) Inventors: Charles Scott, Austin, TX (US); Scott White, Austin, TX (US); Ankur Mukerji, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 13/467,310

(22) Filed: May 9, 2012

(65) Prior Publication Data

US 2012/0222073 A1 Aug. 30, 2012

Related U.S. Application Data

(62) Division of application No. 12/413,822, filed on Mar. 30, 2009, now abandoned.

(51) Int. Cl.
| | |
|---|---|
| H04N 21/482 | (2011.01) |
| H04N 21/432 | (2011.01) |
| H04N 21/466 | (2011.01) |
| H04N 21/4788 | (2011.01) |
| H04N 5/445 | (2011.01) |
| H04N 21/433 | (2011.01) |
| H04N 21/458 | (2011.01) |
| H04N 21/472 | (2011.01) |

(52) U.S. Cl.
CPC ....... *H04N 21/4826* (2013.01); *H04N 5/44543* (2013.01); *H04N 21/432* (2013.01); *H04N 21/4334* (2013.01); *H04N 21/4583* (2013.01); *H04N 21/4668* (2013.01); *H04N 21/4788* (2013.01); *H04N 21/47202* (2013.01); *H04N 21/4825* (2013.01)

(58) Field of Classification Search
CPC ............ H04N 21/432; H04N 21/4668; H04N 21/4788; H04N 21/4825; H04N 21/4826
See application file for complete search history.

(56) References Cited

U.S. PATENT DOCUMENTS

| | | | |
|---|---|---|---|
| 2003/0005448 A1* | 1/2003 | Axelsson et al. | 725/58 |
| 2005/0022251 A1* | 1/2005 | Ohnuma et al. | 725/134 |
| 2005/0149987 A1* | 7/2005 | Boccon-Gibod et al. | 725/135 |
| 2006/0109854 A1* | 5/2006 | Cancel | 370/401 |

(Continued)

OTHER PUBLICATIONS

Restriction Requirement for U.S. Appl. No. 12/413,822 received from the United States Patent and Trademark Office (USPTO) mailed Aug. 3, 2011, 6 pages.

(Continued)

*Primary Examiner* — Ricky Chin
(74) *Attorney, Agent, or Firm* — Toler Law Group, PC

(57) ABSTRACT

A method includes receiving information identifying at least one recommended media content item at a computing device. The information is received from a sender device. The at least one recommended media content item is selected from an electronic program guide and an address associated with the computing device is selected via a graphical user interface at the sender device. The method includes receiving a user selection of at least one item of media content from the at least one recommended media content item. The method includes automatically scheduling recording of the at least one item of media content at a media recorder device when the at least one item of media content is a scheduled program. The method also includes automatically placing the at least one item of media content in an on demand queue when the at least one item of media content includes on demand media content.

20 Claims, 6 Drawing Sheets

(56) References Cited

U.S. PATENT DOCUMENTS

| | | | |
|---|---|---|---|
| 2006/0161950 A1* | 7/2006 | Imai et al. | 725/46 |
| 2007/0124795 A1* | 5/2007 | McKissick et al. | 725/135 |
| 2007/0220554 A1* | 9/2007 | Barton et al. | 725/46 |
| 2008/0098436 A1* | 4/2008 | White | 725/58 |
| 2008/0276275 A1* | 11/2008 | Ellis | 725/39 |
| 2009/0094643 A1* | 4/2009 | Pickelsimer et al. | 725/39 |
| 2009/0119715 A1* | 5/2009 | Schwesinger et al. | 725/58 |
| 2010/0064325 A1* | 3/2010 | Fishman et al. | 725/61 |
| 2010/0229212 A1* | 9/2010 | Liu et al. | 725/109 |

OTHER PUBLICATIONS

Non-Final Office Action for U.S. Appl. No. 12/413,822 received from the United States Patent and Trademark Office (USPTO) mailed Aug. 31, 2011, 18 pages.

Final Office Action for U.S. Appl. No. 12/413,822 received from the United States Patent and Trademark Office (USPTO) mailed Dec. 15, 2011, 15 pages.

* cited by examiner

SYSTEM AND METHOD TO SEND INFORMATION IDENTIFYING RECOMMENDED MEDIA CONTENT ITEMS

PRIORITY CLAIM

This application is a divisional application of, and claims priority from, U.S. application Ser. No. 12/413,822, filed Mar. 30, 2009, which is incorporated herein by reference in its entirety.

FIELD OF THE DISCLOSURE

The present disclosure is generally related to sending information identifying recommended media content items.

BACKGROUND

A user may desire to send information identifying recommended media content items to one or more recipients. For example, a teacher may desire to send information identifying recommended media content items to students. The user may identify recommended media content items and deliver a hardcopy or an email that includes information identifying the recommended media content items to particular recipients. Each recipient may then review the recommended media content items and determine how to view each item. For example, each recipient may manually schedule a recording of media content items at a digital video recorder, manually select video on demand items, and manually schedule download of downloadable media content. When a recipient is not technically knowledgeable, the recipient may encounter difficulties viewing each recommended media content item.

DETAILED DESCRIPTION

In a particular embodiment, a method includes accessing an electronic program guide (EPG) at a computing device (e.g. at a set-top box device or a personal computer). The method includes identifying recommended media content items using the EPG. The method further includes selecting addresses of one or more recipients and sending information identifying the recommended media content items to the selected addresses.

In another particular embodiment, a method includes receiving information identifying recommended media content items at a computing device. The method includes receiving a user selection selecting at least one item of media content from the recommended media content items. When the at least one item of media content is a scheduled broadcast program, the method includes automatically scheduling recording of the at least one item of media content at a media recorder device. When the at least one item of media content includes on demand media content, the method includes automatically placing the at least one item of media content in an on demand queue.

In another particular embodiment, a computer-readable storage medium includes operational instructions that, when executed by a processor, cause the processor to send a first graphical user interface (GUI) to a first computing device. The first GUI enables selection of recommended media content items and enables access to an electronic program guide (EPG). The computer-readable storage medium includes operational instructions that, when executed by the processor, cause the processor to receive, via the first GUI, selections identifying recommended media content items. The computer-readable storage medium includes operational instructions that, when executed by the processor, cause the processor to receive, via the first GUI, addresses of recipients. The computer-readable storage medium further includes operational instructions that, when executed by the processor, cause the processor to send the information identifying the recommended media content items to the addresses of the recipients.

In another particular embodiment, a system includes a first computing device to access an electronic program guide (EPG) to identify recommended media content items based on selections from the EPG and to send information identifying the recommended media content items to addresses associated with selected recipients. The EPG includes information identifying scheduled media content and on demand media content.

Figure 1:
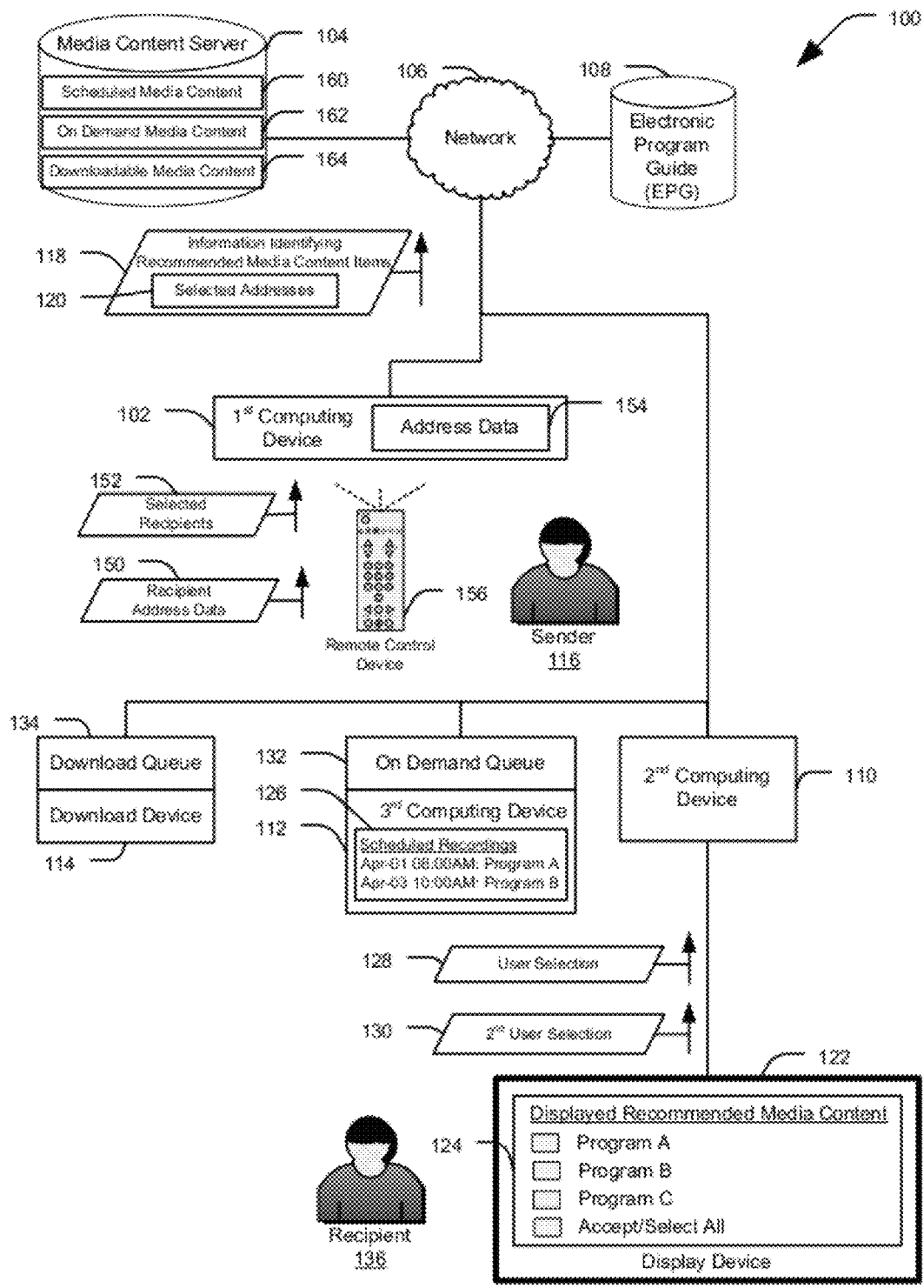
FIG. 1 is a block diagram of a first particular embodiment of a system to send information identifying recommended media content items.

Referring to FIG. 1, a block diagram of a first particular embodiment of a system to send information identifying recommended media content items is depicted and generally designated 100. The system 100 includes a first computing device 102 coupled to a media content server 104 via a network 106. An electronic program guide (EPG) 108, a second computing device 110, a third computing device 112, and a download device 114 may also be coupled to the network 106.

The first computing device 102 is operable to access the EPG 108 and to create information identifying recommended media content items 118 using the EPG 108. The first computing device 102 is further operable to send the information identifying recommended media content items 118 to selected addresses 120 of recipients. For example, a teacher may identify recommended media content items and send the information identifying recommended media content items 118 to students. The first computing device 102 may be a mobile telephony device, a personal digital assistant (PDA) device, a personal computing device, a set-top box (STB) device, other computing device, or any combination thereof. The first computing device 102 may include address data 154 from which a sender 116 may select the selected addresses 120. The address data 154 may include addresses associated with recipients that the sender 116 selects to receive the information identifying recommended media content items 118. The sender 116 may modify the address data 154 by entering recipient address data 150 at the first computing device 102. A particular address from the address data 154 may be a phone number, an email address, an Internet Protocol (IP) address, other address, or any combination thereof.

For example, the address data 154 may include an address of the recipient 136 that is associated with a mobile telephony device.

In a particular embodiment, the sender 116 uses a remote control device 156 to interact with the first computing device 102. For example, when the first computing device 102 is a STB device, the remote control device 156 may be used to interact with the STB device to create the information identifying recommended media content items 218, to select recipients 152 and to send the information identifying recommended media content items 118 to the selected addresses 120 of the selected recipients 152. In a particular embodiment, the remote control device 156 enables the sender 116 to browse the EPG 108 to identify recommended media content items by selecting media content items from the EPG 108. The remote control device 156 may also enable the sender 116 to select recipients 152 from the address data 154. The remote control device 156 may enable the sender 116 to add, delete, or modify a recipient and an address associated with the recipient.

The media content server 104 is operable to provide media content to various devices, such as the first computing device 102, the second computing device 110, the third computing device 112, and the download device 114. The media content server 104 may include various types of media content, including scheduled media content 160, on demand media content 162, and downloadable media content 164. For example, the scheduled media content 160 may include media content, such as television programs or movies, scheduled for broadcast at a particular date and time. The on demand media content 162 may include media content that may be streamed upon request from the media content server 104 to one or more of the devices 102, 110, 112, and 114. The downloadable media content 164 may include media content that may be downloaded from the media content server 104 to one or more of the devices 102, 110, 112, and 114. Although the media content server 104 is illustrated as a single server in FIG. 1, in various embodiments the media content server 104 may include a plurality of servers. For example, the plurality of servers may be a part of a particular service provider network or each server may belong to a separate service provider network.

In a particular embodiment, the second computing device 110 is associated with one of the selected addresses 120 and receives the information identifying recommended media content items 118. The second computing device 110 may display the information identifying recommended media content items 118 at a display device 122 as displayed recommended media content 124. The second computing device 110 may be a personal computer, a personal digital assistant (PDA), a mobile telephony device, a set-top box device, other computing device, or any combination thereof. The second computing device 110 is further operable to receive a user selection 128 from a recipient 136. The user selection 128 may select at least one item from the displayed recommended media content 124. In response to the user selection 128, the second computing device 110 may automatically make the media content associated with the user selection 128 available for playback at the third computing device 112. For example, in response to the user selection 128, the second computing device 110 may automatically schedule a recording of scheduled media content 160, automatically schedule a download of downloadable media content 164, and automatically place on demand media content 162 in a queue. The third computing device 112 may be a digital video recorder (DVR) device, personal computing device, STB device, other computing device, or any combination thereof.

When the user selection 128 selects a scheduled program, the second computing device 110 may instruct the third computing device 112 to automatically schedule recording of the selected media content at the third computing device 112. For example, the recipient 136 may view the displayed recommended media content 124 at the display device 122 of a mobile telephony device, and the user selection 128 may cause the mobile telephony device to automatically schedule recording of the selected media content at a DVR device. When the user selection 128 selects an on demand media content item, the on demand media content item may be automatically placed in an on demand queue 132 of the third computing device 112. When the user selection 128 selects a downloadable media content item, the download device 114 may automatically place the selected media content item in a download queue 134 of the download device 114. In a particular embodiment, the download device may be a personal computing device or a STB device.

In operation, the sender 116 may access the EPG 108 at the first computing device 102. The sender 116 may identify recommended media content items by selecting media content items using the EPG 108. Further, the sender 116 may select one or more addresses from the address data 154, such as an address associated with the recipient 136. The first computing device 102 may send the information identifying recommended media content items 118 to the selected addresses 120 associated with the selected recipients 152. The information identifying recommended media content items 118 may be received at the second computing device 110 when the second computing device 110 is associated with an address of the selected addresses 120. The second computing device 110 may display the displayed recommended media content 124 at the display device 122. The recipient 136 may provide the user selection 128, selecting at least one item of media content from the displayed recommended media content 124. For example, the recipient 136 may select program A from displayed recommended media content 124. The second computing device 110 may receive the user selection 128 and automatically schedule at least one item of media content from the displayed recommended media content 124 for recording at the third computing device 112. For example, the third computing device 112 may be a media recorder device such as a DVR. The displayed recommended media content 124 may include a user selectable option to select (e.g., accept) all of the recommended media content. For example, when the recipient 136 accepts items from the information identifying the recommended media content items 118, all of the media content of the displayed recommended media content 124 may be automatically scheduled for recording at the third computing device 112.

The second computing device 110 may determine whether a selected item of media content is the scheduled media content 160, the downloadable media content 164, or the on demand media content 162 and perform an appropriate action to provide the selected item of media content for playback. For example, when the user selection 128 includes a scheduled program from the scheduled media content 160, the second computing device 110 may automatically schedule recording of the scheduled program at the third computing device 112. In a particular embodiment, the second computing device 110 automatically schedules recording of a scheduled program by accessing the EPG 108. When the user selection 128 includes the on demand media content 162, the second computing device 110 may automatically place the on demand media content 162 in an on demand queue 132 associated with the third computing device 112. For example, the second computing device 110 may send a request to purchase the on demand media content to the media content server 104, and in response the media content server 104 may place the on demand media content 162 in the on demand queue 132 associated with the third computing device 112. When the user selection 128 includes the downloadable media content 164, the second computing device 110 may automatically schedule the downloadable media content 164 for download at the download device 114. In a particular embodiment, the download device 114 is integrated with the third computing device 112. For example, when the third computing device is a STB, the download device 114 may be internal to the STB. In another particular embodiment, the download device 114 is a device separate from the third computing device 112. For example, the third computing device 112 may be a set-top box device while the download device 114 may be a personal computing device. In a particular embodiment, scheduling a download of at least one item of media content at the download device 114 includes setting a priority of the item of media content and placing the item of media content in the download queue 134 associated with the download device 114. In this way, the second computing device 110 may perform appropriate actions to make each selected item of media content available to the recipient 136.

When the user selection 128 conflicts with one or more scheduled recordings 126 at the third computing device 112, the second computing device 110 may automatically identify a second presentation of a program associated with either the previously scheduled recording 126 or associated with the selected media content. The second computing device 110 may prompt the recipient 136 to select which of the second presentations to record. For example, the information identifying recommended media content items 118 may include a program X that is scheduled at the same time as a program A in the scheduled recordings 126. The second computing device 110 may automatically determine a second presentation of either program X or program A. The second computing device 110 may prompt the recipient 136 to select from among the second alternatives. The second computing device 110 may receive a second user selection 130 and schedule the second presentation for recording at the third computing device 112.

Thus, the sender 116 can efficiently send the information identifying recommended media content items 118 to the selected addresses 120 of one or more recipients. For example, a teacher may create the information identifying recommended media content items 118 and send the information identifying recommended media content items 118 to students. An example of information identifying recommended media content items 118 is a list of content item titles. In addition, each of the recipients of the information identifying recommended media content items 118 may select only those media content items that they wish to view and the second computing device 110 performs various actions to automatically make the selected items available. Furthermore, the second computing device 110 automatically determines whether a particular media content item is scheduled media content 160, downloadable media content 164, or on demand media content 162 and then takes an appropriate action to make the particular media content available to the recipient 136. In this way, the recipient 136 can automatically obtain multiple media content items from the information identifying recommended media content items 118 via a single selection.

Figure 2:
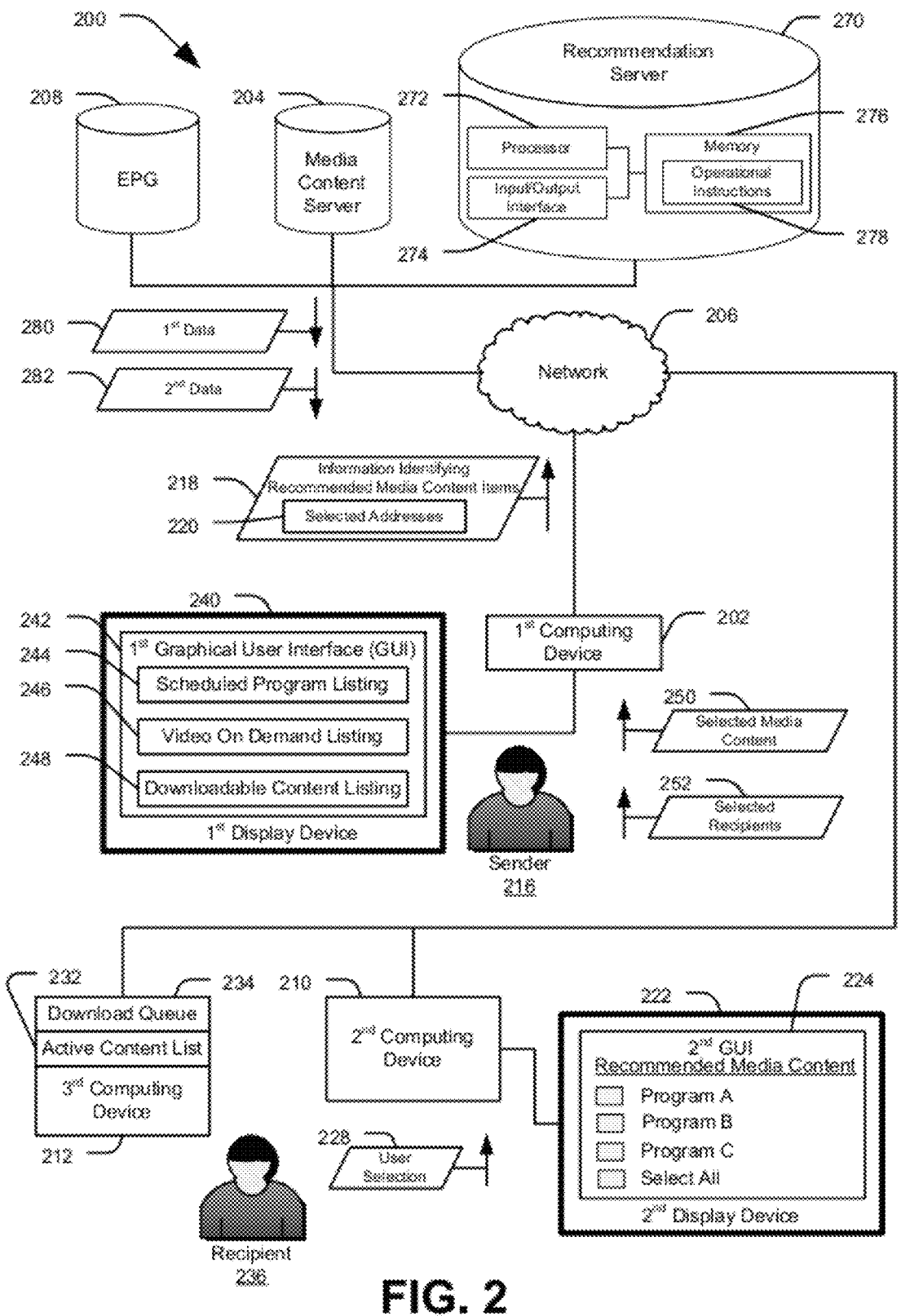
FIG. 2 is a block diagram of a second particular embodiment of a system to send information identifying recommended media content items.

Referring to FIG. 2, a block diagram of a second particular embodiment of a system to send information identifying recommended media content items is depicted and generally designated 200. The system 200 includes a first computing device 202 coupled to a media content server 204 via a network 206. In the illustrated embodiment, an electronic program guide (EPG) 208, a second computing device 210, a third computing device 212, and a recommendation server 270 are also coupled to the network 206.

The media content server 204 is operable to provide media content to various devices, such as the first computing device 202, the second computing device 210, and the third computing device 212. The media content server 204 may include various types of media content, such as scheduled media content, on demand media content, downloadable media content, other media content, or any combination thereof. Although the media content server 204 is illustrated as a single server in FIG. 2, in various embodiments the media content server 204 may include a plurality of servers. For example, the plurality of servers may be a part of a particular service provider network, or each server may belong to a separate service provider network.

The recommendation server 270 is operable to send first data 280 representing a first graphical user interface (GUI) 242 to the first computing device 202 and is operable to send second data 282 representing a second GUI 224 to the second computing device 210. In the embodiment illustrated, the recommendation server 270 includes a processor 272, an input/output interface 274, and a memory 276. The memory 276 includes operational instructions 278 that are executable by the processor 272 to perform the various functions of the recommendation server 270.

The first computing device 202 is operable to receive the first data 280 from the recommendation server 270 and to display the first GUI 242 at a first display device 240. The first GUI 242 may include one or more of a scheduled program listing 244, a video on demand listing 246, and a downloadable content listing 248. In a particular embodiment, the functions described as being performed by the first computing device 202 are performed by a combination of the first computing device 202 and the recommendation server 270. For example, the first computing device 202 may access the EPG 208 via the recommendation server 270.

A sender 216 may use the first GUI 242 to create information identifying recommended media content items 218. For example, the sender 216 may create the information identifying recommended media content items 218 by accessing the EPG 208 via the first GUI 242. The first computing device 202 is operable to receive, via the first GUI 242, a selection of selected media content 250 to create the information identifying recommended media content items 218. The first computing device 202 is further operable to receive, via the first GUI 242, a selection of selected recipients 252 and to identify the selected addresses 220 associated with the selected recipients 252. The first computing device 202 is further operable to send the information identifying recommended media content items 218 to the selected addresses 220. The first computing device 202 may be a mobile telephony device, a personal computing device, a personal digital assistant (PDA) device, a set-top box (STB) device, or any other computing device.

The second computing device 210 is operable to receive second data 282 from the recommendation server 270 and to display the second GUI 224 at a second display device 222. For example, the second GUI 224 may display the information identifying recommended media content items 218 at the second display device 224. The second computing device 210 may be associated with one of the selected addresses 220 associated with the selected recipients 252. In a particular embodiment, the functions described as being performed by the second computing device 210 are performed by a combination of the second computing device 210 and the recommendation server 270. For example, the second computing device 210 may send a message to the recommendation server 270 requesting the recommendation server 270 to provide selected media content items for download. The second computing device 210 may enable a recipient 236 to select, via the second GUI 224, at least one item of the selected media content items from the second GUI 224. The second computing device 210 is operable to receive a user selection 228 via the second GUI 224. The user selection 228 may select at least one item of media content from the information identifying recommended media content items 218. After receiving the user selection 228, the second computing device 210 is operable to automatically schedule recording of the selected item of media content at the third computing device 212. The third computing device 212 may be a personal computing device, a STB device, a DVR device, or other computing device. In a particular embodiment, the third computing device 212 is integrated with the second computing device 210. In another particular embodiment, the third computing device 212 is a different device that is independent of the second computing device 210. The user selection 228 may select one or more of the items of recommended media content displayed at the second GUI 224. In a particular embodiment, the user selection 228 may select all of the recommended media content via a "select all" selection.

The second computing device 210 is further operable to automatically determine whether scheduling recording of the at least one item of media content would conflict with a previously scheduled recording at the third computing device 212. The second computing device 210 is operable to automatically identify a second presentation of a program associated with the previously scheduled recording or the at least one item of media content. The second computing device 210 is further operable to automatically schedule the second presentation for recording at the third computing device 212. For example, the information identifying recommended media content items 218 may identify a program X that is scheduled for recording at the same time that a program A is scheduled for recording. The second computing device 210 may automatically identify a second presentation of either program X or program A and automatically schedule the second presentation for recording at the third computing device 112.

The second computing device 210 may automatically perform various actions to make each selected item of media content available to the recipient 236. For example, the second computing device 210 may automatically schedule recording of at least one item of media content from the information identifying recommended media content items 218 at the third computing device 212 when the selected media content includes a scheduled program. The second computing device 210 may automatically identify at least one item of media content in an active content list 232 associated with the third computing device 212 when the selected item of media content includes on demand media content. The second computing device 210 may automatically schedule download of the selected item of media content at the third computing device 212 when the selected item of media content includes downloadable media content. For example, the selected media content item may be automatically placed in a download queue 234 associated with the third computing device 212.

In operation, the recommendation server 270 may send the first data 280 to the first computing device 202 for display at the first display device 240. The first computing device 202 may display, via the first GUI 242, the information identifying recommended media content items 218 and selected addresses 220 of selected recipients 252. The first computing device 202 may send the information identifying recommended media content items 218 to the selected addresses 220.

A computing device associated with each of the selected addresses 220 may receive the information identifying recommended media content items 218. For example, the selected addresses 220 may include an address associated with the second computing device 210. The second computing device 210 may receive the information identifying recommended media content items 218 and display the information identifying recommended media content items 218 via the second GUI 224, at the second display device 222. The second computing device 210 may, via the second GUI 224, receive a user selection 228 of one or more of the items of the recommended media content. The second computing device 210 may automatically make the selected one or more items of media content available for playback at the third computing device 212. For example, when the item of media content is a scheduled program, the item of media content may be automatically scheduled for recording at the third computing device 212. When the selected item of media content includes on demand media content, the selected item of media content may be automatically identified in the active content list 232 associated with the third computing device 212. When the item of media content includes downloadable media content, the downloadable media content may be automatically scheduled for download at the third computing device 212. For example, the downloadable media content may be placed in the download queue 234 associated with the third computing device 212.

Thus, the recipient 236 may receive the information identifying recommended media content items 218, select one or more items of the recommended media content, and have the selections automatically made available for playback at the third computing device 212. The recipient 236 does not have to determine whether a particular item from the information identifying recommended media content items 218 is downloadable media content or video-on demand media content or scheduled media content. Instead, the second computing device 210 determines how each selected item of media content may be obtained for viewing and automatically schedules recording of scheduled programs, automatically places on demand items in the active content list 232, and automatically places downloadable media content items in the download queue 234. By receiving and performing various actions after receiving the user selection 228, the second computing device 210 makes selected items from the information identifying recommended media content items 218 available to the recipient 236. In this way, the amount of effort required to make each selected item of media content available to the recipient 236 is reduced.

Figure 3:
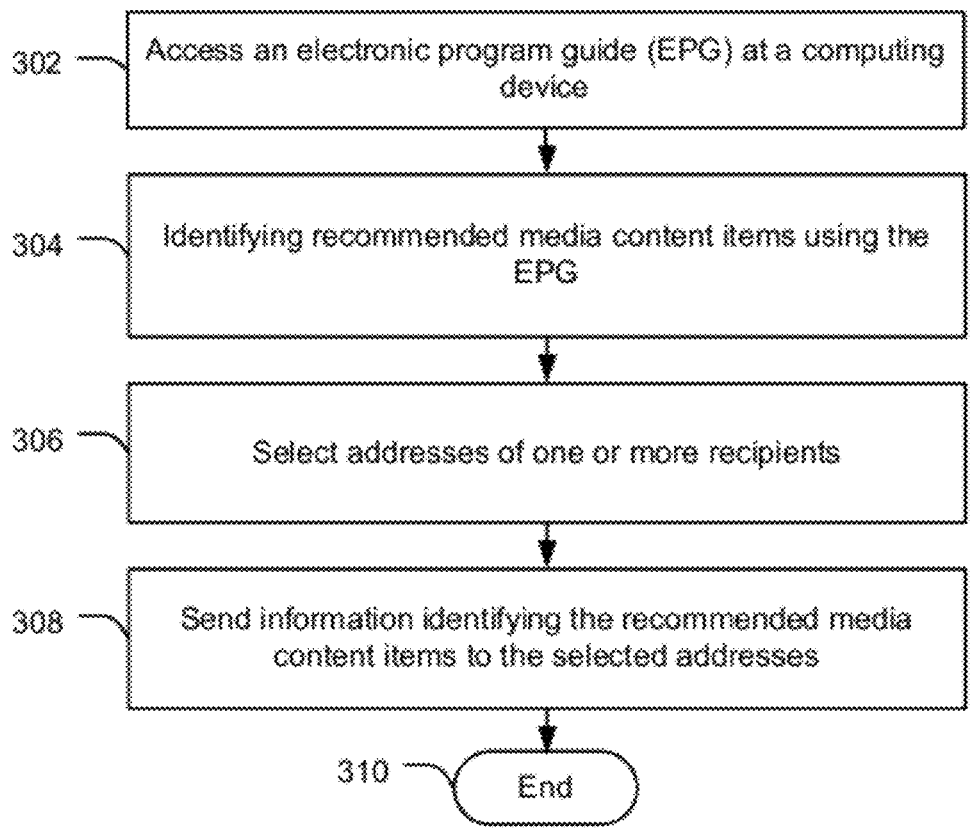
FIG. 3 is a flow diagram of a first particular embodiment of a method to send information identifying recommended media content items.

FIG. 3 is a flow diagram of a first particular embodiment of a method to send information identifying recommended media content items. The method may be performed by a computing device, such as the first computing device 102 of FIG. 1, the first computing device 202 of FIG. 2, or the recommendation server 270 of FIG. 2.

The method begins by accessing an electronic program guide (EPG) at a computing device, at 302. Moving to 304, recommended media content items are identified using the EPG. Advancing to 306, an address of one or more recipients is selected. Proceeding to 308, information identifying the recommended media content is sent to the selected addresses. For example, in FIG. 1, the sender 116 may access the EPG 108 via the first computing device 102 to create the recommended media content items 118. The sender 116 may use the first computing device 102 to select selected recipients 152 and send the recommended media content items 118 to the selected addresses 120. The method ends at 310.

Thus, a sender can access an EPG to easily identify recommended media content items from scheduled programs, on demand media content, and downloadable media content, and can send information identifying the recommended media content to one or more recipients.

Figure 4:
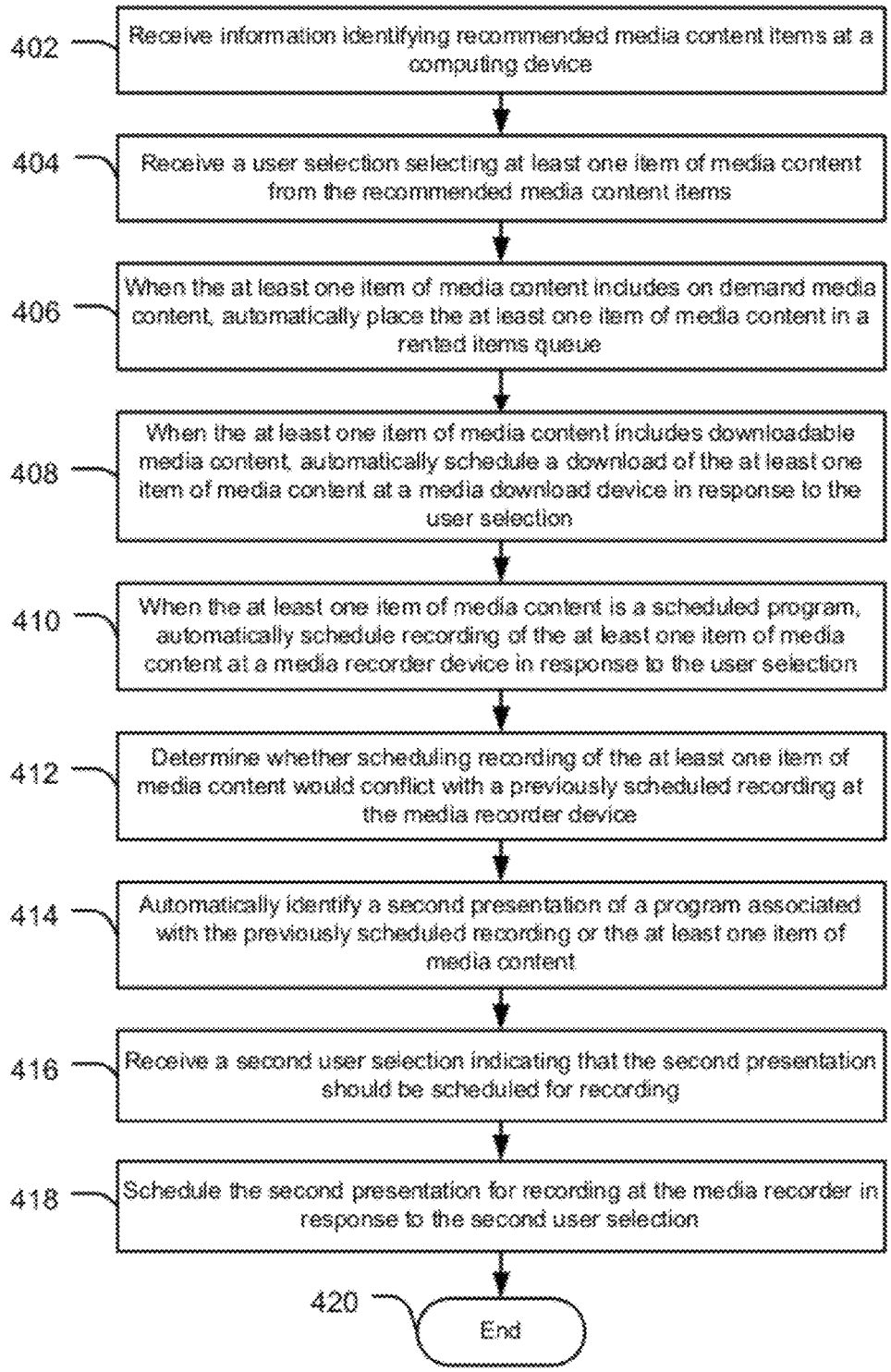
FIG. 4 is a flow diagram of a second particular embodiment of a method to send information identifying recommended media content items.

FIG. 4 is a flow diagram of a second particular embodiment of a method to send information identifying recommended media content items. The method may be performed by the second computing device 110 of FIG. 1, the second computing device 210 of FIG. 2, or the recommendation server 270 of FIG. 2.

The method begins by receiving information identifying recommended media content items at a computing device, at 402. Moving to 404, a user selection is received selecting at least one item of media content from the recommended media content items. Advancing to 406, when the at least one item of media content includes on demand media content, the at least one item of media content is automatically placed in an on demand queue. Proceeding to 408, when the at least one item of media content includes downloadable media content, the at least one item of media content may be automatically scheduled for download at a media download device. Moving to 410, when the at least one item of media content is a scheduled program, recording of the at least one item of media content may be automatically scheduled at a media recorder in response to the user selection. For example, in FIG. 2, the second computing device 210 may receive the information identifying recommended media content items 218, receive the user selection 228 selecting at least one item of media content from the information identifying recommended media content items 218, and make the at least one item of media content available to the recipient 236.

Advancing to 412, a determination may be made whether scheduling a recording of the at least one item of media content would conflict with a previously scheduled recording at the media recorder device. Proceeding to 414, a second presentation of one of the programs associated with the previously scheduled recording and the at least one item of media content may be automatically identified. Advancing to 416, a second user selection may be received indicating that the second presentation should be scheduled for recording. Continuing to 418, the second presentation may be scheduled for recording at the media recorder. The method ends at 420. Thus, a recipient can select at least one item of media content from information identifying recommended media content items and have the selected at least one item of media content automatically made available for viewing.

Figure 5:
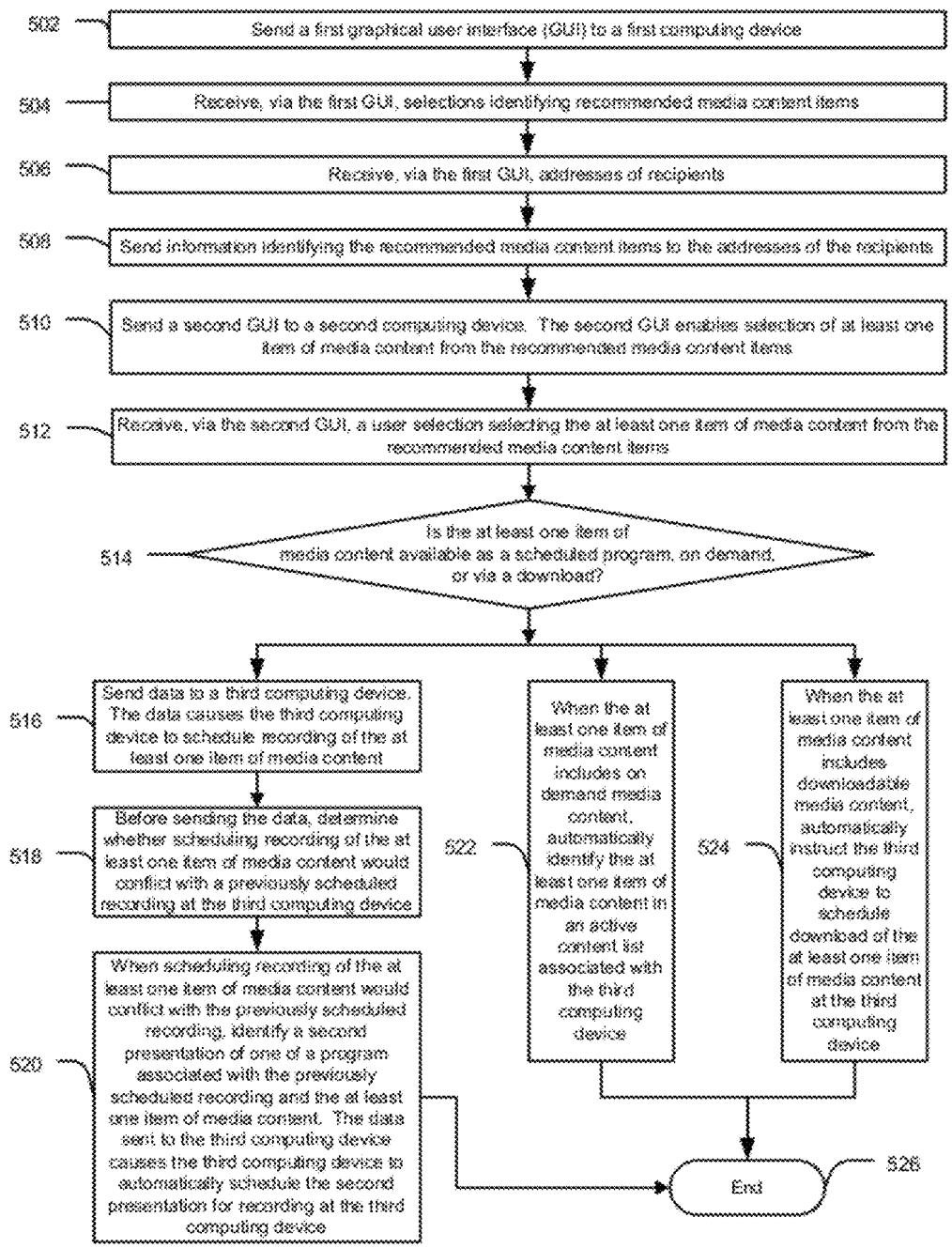
FIG. 5 is a flow diagram of a third particular embodiment of a method to send information identifying recommended media content items.

FIG. 5 is a flow diagram of a third particular embodiment of a method to send information identifying recommended media content items. The method may be performed by the first computing device 102 of FIG. 1, the second computing device 110 of FIG. 1, the first computing device 202 of FIG. 2, the second computing device 210 of FIG. 2, or the recommendation server 270 of FIG. 2.

The method begins by sending a first graphical user interface (GUI) to a first computing device, at 502. The first GUI may be used to identify recommended media content items. The first GUI may enable access to an electronic program guide (EPG). Moving to 504, selections identifying recommended media content items are received via the first GUI. Moving to 506, addresses of recipients are received via the first GUI. Advancing to 508, information identifying the recommended media content items is sent to the addresses of the recipients. For example, in FIG. 2, the recommendation server 270 sends the first GUI 242 to the first computing device 202. The recommendation server 270 may receive the information identifying recommended media content items 218 and the selected addresses 220 via the first GUI 242.

Proceeding to 510, a second GUI is sent to a second computing device. The second GUI enables selection of at least one item of media content from the recommended media content items. Proceeding to 512, a user selection may be received via the second GUI selecting the at least one item of media content from the recommended media content items. Proceeding to 514, a determination may be made whether the at least one item of media content is available as a scheduled program, an on demand program, or via a download. When the at least one item of media content includes a scheduled program, at 514, data may be sent to a third computing device that causes the third computing device to schedule recording of the at least one item of media content, at 516. Proceeding to 518, before sending the data, a determination may be made whether scheduling recording of the at least one item of media content would conflict with a previously scheduled recording at the third computing device. Moving to 520, when scheduling recording of the at least one item of media content would conflict with the previously scheduled recording, a second presentation of one of a program associated with the previously scheduled recording and the at least one item of media content may be identified. The data sent to the third computing device may cause the third computing device to automatically schedule the second presentation for recording at the third computing device. The method ends at 526.

When the at least one item of media content includes on demand media content, at 514, the at least one item of media content may be automatically identified in an active content list associated with the third computing device, at 522. The method ends at 526.

When the at least one item of media content includes downloadable media content, at 514, a download of the at least one item of media content may be automatically scheduled at the third computing device, at 524. The method then ends at 526.

Figure 6:
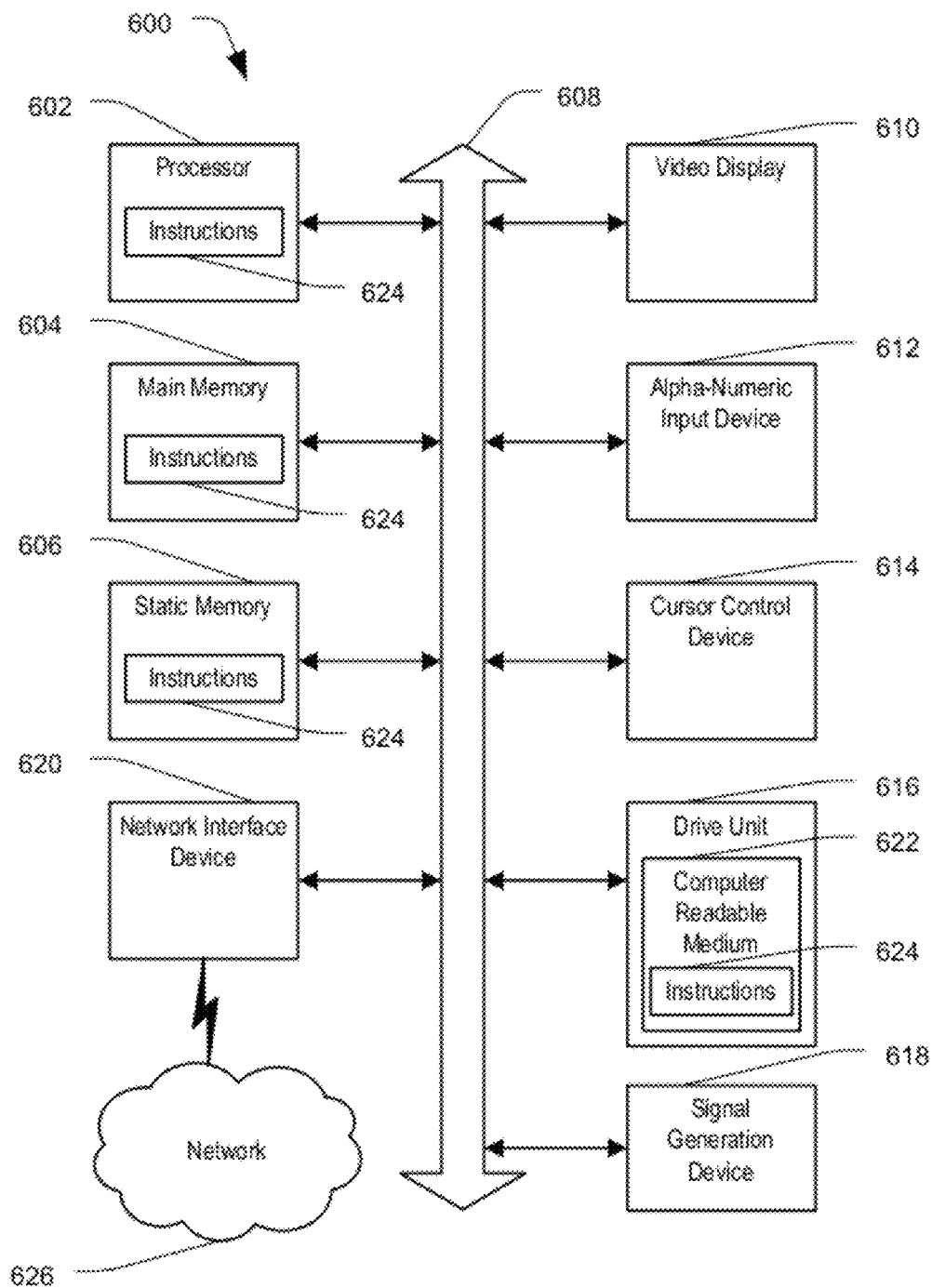
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600, or any portion thereof, may be connected, e.g., using a network, to other computer systems or peripheral devices.

In a networked deployment, the computer system 600 may operate in the capacity of a computing device, such as the first computing device 102 of FIG. 1, the second computing device 110 of FIG. 1, the third computing device 112 of FIG. 1, the download device 114 of FIG. 1, the first computing device 202 of FIG. 2, the second computing device 210 of FIG. 2, the third computing device 212 of FIG. 2, and the recommendation server 270 of FIG. 2. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a network router, a wireless telephone, a land-line telephone, a control system, a camera, a scanner, a facsimile machine, a printer, a pager, a personal trusted device, a web appliance, a switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), a cathode ray tube (CRT) display, an organic light emitting diode (OLED), a flat panel display, a solid-state display, or a projection display. Additionally, the computer system 600 may include an input device 612, such as a keyboard or a remote control, and a cursor control device 614, such as a mouse or a remote control. The computer system 600 can also include a disk drive unit 616, a signal generation device 618, such as a speaker, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored. It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, MPEG, SMPTE, H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method comprising:
   receiving information identifying a plurality of recommended media content items at a computing device, wherein the information is received from a sender device that is different from the computing device, and wherein the plurality of recommended media content items includes at least a first recommended media content item and a second recommended content item;
   responsive to receiving a user input corresponding to selection of an accept all option:
      automatically performing a first action that includes sending instructions to a second computing device to automatically place an identifier of the first recommended media content item in an on-demand items queue associated with the second computing device upon determining that the first recommended media content item has a first media content type associated with on-demand media content, and wherein the second computing device is distinct from the computing device and the sender device; and
      automatically performing a second action that is different from the first action upon determining that the second recommended media content item has a second media content type that is different from the first media content type.

2. The computer implemented method of claim 1, wherein the second media content type is associated with downloadable media content, wherein automatically performing the second action includes sending instructions to a media download device to automatically schedule a download of the second recommended media content item to the media download device, and wherein the media download device is distinct from the computing device, the sender device, and the second computing device.

3. The computer implemented method of claim 2, wherein scheduling the download of the second recommended media content item comprises:
   setting a priority of the second recommended media content item; and
   placing the identifier of the second recommended media content item in a download queue.

4. The computer implemented method of claim 1, wherein the second media content type is associated with a scheduled program, wherein automatically performing the second action includes sending instructions to a media recorder device to automatically schedule a recording of the second recommended media content item at the media recorder device, and wherein the media recording device is distinct from the computing device.

5. The computer implemented method of claim 4, further comprising sending instructions to the media recorder device to:
   determine whether scheduling the recording of the second recommended media content item at a first time would conflict with a previously scheduled recording at the media recorder device;
   schedule the second recommended media content item to be recorded at the first time in response to determining that there is no conflict;
   automatically identify a second presentation of a program associated with the previously scheduled recording or the second recommended media content item in response to determining that the scheduling of the recording of the second recommended media content item at the first time would conflict with the previously scheduled recording; and
   schedule the second presentation for recording at the media recorder device in response to receiving a second user input corresponding to approval to record the second presentation.

6. The computer implemented method of claim 1, wherein the second computing device comprises a set-top box.

7. The computer implemented method of claim 1, wherein the computing device comprises a mobile communication device.

8. The computer implemented method of claim 1, wherein the plurality of recommended media content items are selected via a first electronic program guide displayed at the sender device, and wherein the plurality of recommended media content items are displayed via a second electronic program guide at the computing device.

9. The computer implemented method of claim 8, wherein a first user of the sender device is a teacher, wherein a second user of the computing device is a student, and wherein the plurality of recommended media content items are associated with an educational course.

10. The computer implemented method of claim 9, wherein an address associated with the computing device is selected by the teacher via the first electronic program guide.

11. The computer implemented method of claim 10, wherein the address is one of a plurality of addresses of computing devices associated with multiple students that are selected by the teacher via the first electronic program guide, and wherein the information identifying the plurality of recommended media content items is sent to each of the computing devices.

12. A computer-readable storage device comprising instructions that, when executed by a processor, cause the processor to perform operations comprising:
   receiving information identifying a plurality of recommended media content items at a computing device, wherein the information is received from a sender device that is different from the computing device, and wherein the plurality of recommended media content items includes at least a first recommended media content item and a second recommended media content item;
   sending a listing of the plurality of recommended media content items and an accept all option to a display device;

responsive to receiving a user input corresponding to selection of the accept all option:

automatically performing a first action that includes sending instructions to a second computing device to automatically place an identifier of the first recommended media content item in an on-demand items queue associated with the second computing device upon determining that the first recommended media content item has a first media content type associated with on-demand media content, and wherein the second computing device is distinct from the computing device and the sender device; and automatically performing a second action that is different from the first action upon determining that the second recommended media content item has a second media content type that is different from the first media content type.

13. The computer-readable storage device of claim 12, wherein the computer-readable storage device is a component of a mobile communication device.

14. The computer-readable storage device of claim 12, wherein the second media content type is associated with downloadable media content, wherein automatically performing the second action includes sending instructions to a media download device to automatically schedule a download of the second recommended media content item to the media download device, and wherein the media download device is distinct from the computing device, the sender device, and the second computing device.

15. The computer-readable storage device of claim 12, wherein the second media content type is associated with a scheduled program, wherein automatically performing the second action includes sending instructions to a media recorder device to automatically schedule a recording of the second recommended media content item at the media recorder device, and wherein the media recording device is distinct from the computing device.

16. A system comprising:
a processor, and
a memory accessible to the processor, the memory comprising instructions executable by the processor to perform operations comprising:

receiving information identifying a plurality of recommended media content items at a computing device, wherein the information is received from a sender device that is different from the computing device, and wherein the plurality of recommended media content items includes at least a first recommended media content item, a second recommended content item, and a third recommended media content item;

responsive to receiving a user input corresponding to selection of an accept all option:

automatically sending first instructions to a second computing device to automatically place an identifier of the first recommended media content item in an on-demand items queue associated with the second computing device upon determining that the first recommended media content item has a first media content type associated with on-demand media content and wherein the second computing device is distinct from the computing device and the sender device;

automatically sending second instructions to a media download device to automatically schedule a download of the second recommended media content item to the media download device upon determining that the second recommended media content item has a second media content type associated with downloadable media content, wherein the media download device is distinct from the computing device, the sender device, and the second computing device; and automatically sending third instructions to a media recorder device to automatically schedule a recording of the third recommended media content item to the media recorder device upon determining that the third recommended media content item has a third media content type associated with a scheduled program, wherein the media recording device is distinct from the computing device.

17. The system of claim 16, further comprising a display device coupled to the processor, wherein the display device receives a graphical user interface from the processor, and wherein the graphical user interface displays a title of each recommended content item of the plurality of recommended media content items.

18. The system of claim 16, wherein the third instructions further comprise instructions to:

determine whether scheduling recording of the third recommended media content item at a first time creates a conflict with a scheduled recording of a second program, wherein the second program is scheduled to be recorded at the first time in response to determining that the scheduling of the recording of the third recommended media content item at the first time creates the conflict with the scheduled recording of the second program;

identify a second presentation of the third recommended media content item in response to determining that the scheduling of the recording of the third recommended media content item at the first time creates the conflict with the scheduled recording of the second program; and schedule recording of the second presentation in response to receiving a second user input corresponding to approval to record the second presentation.

19. The system of claim 16, wherein the operations third instructions further comprise instructions to:

determine whether scheduling recording of the third recommended media content item at a first time creates a conflict with a scheduled recording of a second program, wherein the third recommended media content item is scheduled to be recorded at the first time in response to determining that the scheduling of the recording of the third recommended media content item at the first time creates the conflict with the scheduled recording of the second program;

identify a second presentation of the second program in response to determining that the scheduling of the recording of the third recommended media content item at the first time creates the conflict with the scheduled recording of the second program; and schedule recording of the second presentation in response to receiving a second user input corresponding to approval to record the second presentation in place of the scheduled recording of the second program.

20. The system of claim 16, wherein the second computing device comprises a set-top box.

* * * * *